(12) United States Patent
Pendas et al.

(10) Patent No.: US 12,383,095 B1
(45) Date of Patent: Aug. 12, 2025

(54) SYSTEM AND METHOD FOR AUTOMATED WATER HEATING AND DISPENSE CYCLES FOR BREWING POUR-OVER COFFEE

(71) Applicant: Fuego Product Development LLC, Austin, TX (US)

(72) Inventors: Juan Carlos Lopez Pendas, Puebla (MX); Xavier González de la Cruz, Puebla (MX); Uriel Guerrero Pastrana, Puebla (MX); Maria del Carmen Ramirez Franco, Puebla (MX)

(73) Assignee: Fuego Product Development LLC, Austin, TX (US)

( * ) Notice: Subject to any disclaimer, the term of this patent is extended or adjusted under 35 U.S.C. 154(b) by 0 days.

(21) Appl. No.: 19/042,935

(22) Filed: Jan. 31, 2025

Related U.S. Application Data (60) Provisional application No. 63/627,496, filed on Jan. 31, 2024.

(51) Int. Cl.
*A47J 31/46* (2006.01)
*A47J 31/057* (2006.01)

(52) U.S. Cl.
CPC ............. *A47J 31/46* (2013.01); *A47J 31/057* (2013.01)

(58) Field of Classification Search
CPC ....... A47J 31/46; A47J 31/057; A47J 31/0576
USPC ..................................................... 99/307, 315
See application file for complete search history.

(56) References Cited

U.S. PATENT DOCUMENTS

| 9,737,168 | B2 * | 8/2017 | Lee | A47J 31/005 |
| 2012/0183659 | A1 * | 7/2012 | Hulett | A47J 31/46 426/431 |
| 2013/0125759 | A1 * | 5/2013 | Lin | A47J 31/44 99/281 |
| 2019/0008311 | A1 * | 1/2019 | Lin | A23F 5/262 |

* cited by examiner

*Primary Examiner* — Reginald Alexander
(74) *Attorney, Agent, or Firm* — Run8 Patent Group, LLC; Peter Miller; Leah Raddatz (57) ABSTRACT

One variation of an automated boiler includes: a container including a reservoir configured to store a volume of water, a heating element, and a temperature sensor; a hose fluidly coupled to the heating element; a nozzle coupled to the hose and configured to dispense volumes of water into a pour-over setup loaded with coffee grounds; a lid coupled to the container; a positioner assembly—arranged within the lid—including an arm extending from the lid and configured to retain the nozzle, and, a set of positioner actuators configured to drive translation of the arm; and a controller configured to actuate the heating element to regulate temperature of water toward a dispense temperature based on a signal output by the temperature sensor, and, actuate the set of positioner actuators to drive the nozzle across a sequence of positions to dispense water into the pour-over setup according to a target dispense pattern.

16 Claims, 5 Drawing Sheets

SYSTEM AND METHOD FOR AUTOMATED WATER HEATING AND DISPENSE CYCLES FOR BREWING POUR-OVER COFFEE

CROSS-REFERENCE TO RELATED APPLICATIONS

This Application claims the benefit of U.S. Provisional Application No. 63/627,496, filed on 31 Jan. 2024, which is incorporated in its entirety by this reference.

TECHNICAL FIELD

This invention relates generally to the field of water boilers for brewing coffee and, more specifically, to a new and useful system and method for executing automated heating and dispense cycles and controls for brewing pour-over coffee in the field of water boilers for brewing coffee.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Automated Boiler

As shown in FIGS. 1A, 1B, and 2-4, an automated boiler 100 includes a container 110 configured to seat on a prep surface and including: a water reservoir 112 configured to transiently store a volume of water; a heating element 114 configured to heat metered volumes of water received from the water reservoir 112; a temperature sensor 116 configured to output a signal representing a temperature of water exiting the heating element 114; and an outlet fluidly coupled to the heating element 114. The automated boiler 100 further includes: a hose 120 fluidly coupled to the outlet; a nozzle 130 fluidly coupled to the hose 120, opposite the outlet, and configured to transiently dispense volumes of water into a pour-over setup loaded with coffee grounds and arranged on the prep surface; a lid 140 flexibly coupled to the container 110 and defining a slot; and a positioner assembly 150 arranged within the lid 140. The positioner assembly 150 includes: a nozzle arm 152 extending through the slot and defining a head configured to accept and retain the nozzle 130 at a target height from the prep surface above the pour-over setup; a set of positioner arms 154 flexibly coupled to the nozzle arm 152 at a pivot arranged within the lid 140; and a set of positioner actuators 156 configured to transiently drive the set of positioner arms 154 to drive translation of the nozzle arm 152 and the nozzle 130.

The automated boiler 100 further includes a controller 160 configured to, during a dispense cycle: interpret the temperature of water exiting the heating element 114 based on the signal output by the temperature sensor 116; based on the temperature, selectively actuate the heating element 114 to regulate the temperature of water dispensed by the nozzle 130 to within a threshold deviation of a target dispense temperature; and selectively drive the set of positioner actuators 156 to drive the nozzle 130 across a sequence of positions defined by a target dispense pattern defined for the dispense cycle to dispense heated water into the pour-over setup according to the target dispense pattern.

Figure 1A:
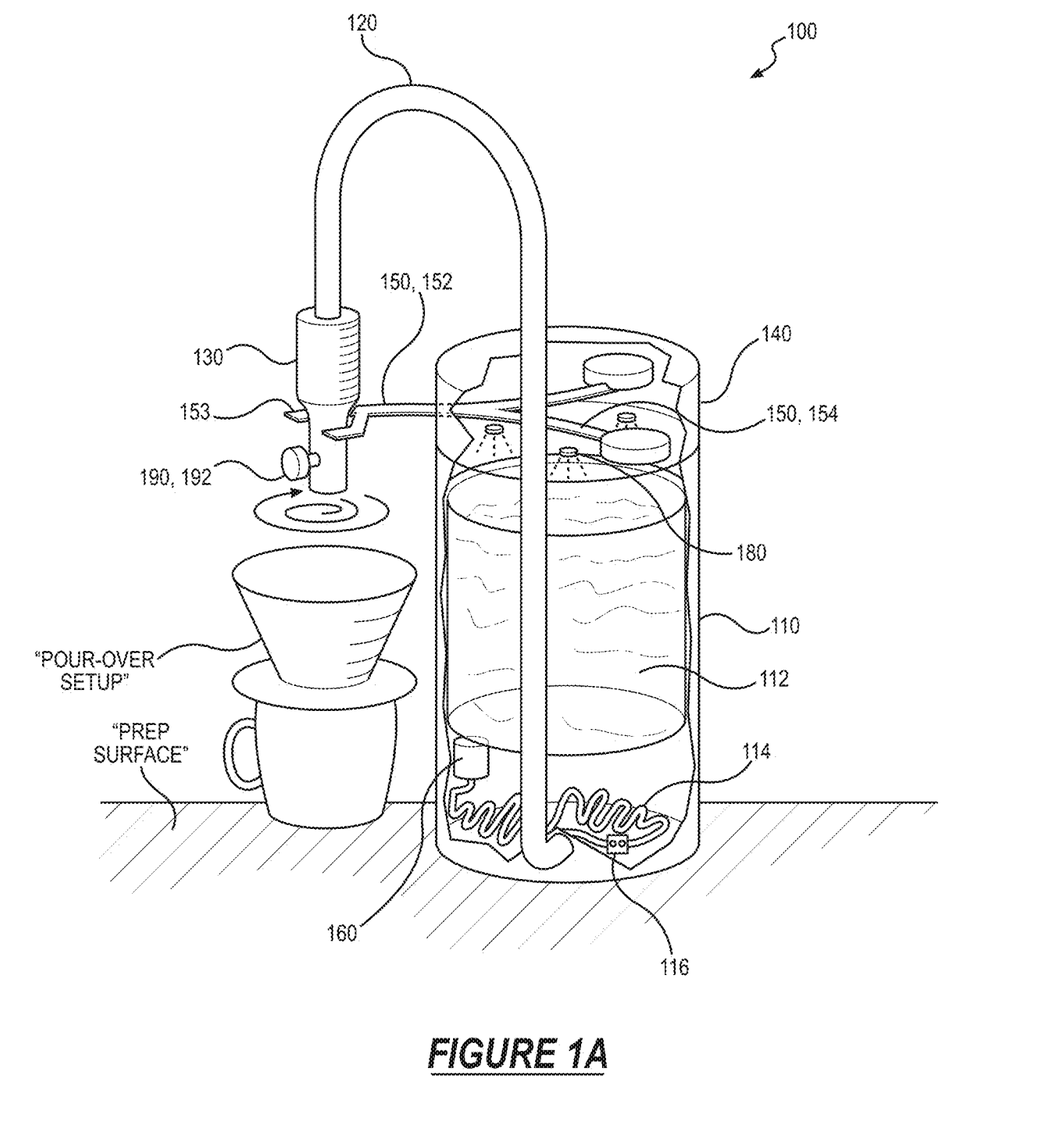
FIGS. 1A and 1B are schematic representations of an automated boiler.
Figure 1B:
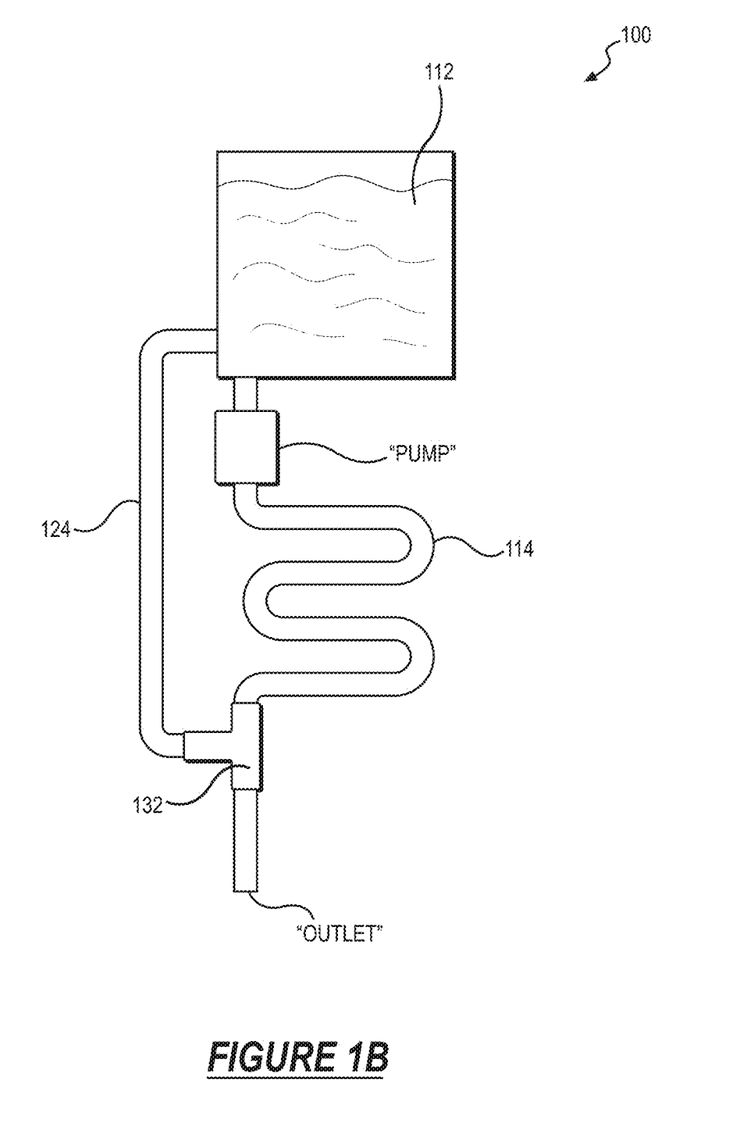

In one variation, as shown in FIGS. 1A and 1B, the automated boiler 100 includes a container 110 configured to seat on a prep surface and including: a water reservoir 112 configured to transiently store a volume of water; a heating element 114 (e.g., a coil) configured to heat metered volumes of water received from the water reservoir 112; a temperature sensor 116 configured to output a signal representing temperature of water exiting the heating element 114; and an outlet fluidly coupled to the heating element 114. The automated boiler 100 further includes: a hose 120 fluidly coupled to the outlet of the container 110; a nozzle 130 fluidly coupled to the hose 120, opposite the outlet, and configured to transiently dispense volumes of water into a pour-over setup—loaded with coffee grounds—arranged beneath the nozzle 130 and on the prep surface; and a lid 140—flexibly coupled to the container 110—defining a slot and including a nozzle arm 152 extending through the slot (e.g., outward from the lid 140) and defining a head configured to accept and retain the nozzle 130 at a target height from the prep surface above the pour-over setup. The lid 140 includes a positioner assembly 150 including: a set of positioner arms 154 flexibly coupled to the nozzle arm 152 at a pivot arranged within the lid 140; and a set of positioner actuators 156 configured to transiently drive the set of positioner arms 154 to drive translation (e.g., within an x, y plane) of the nozzle arm 152 and the nozzle 130. The automated boiler 100 further includes a controller 160 configured to, during a dispense cycle: interpret a temperature of water exiting the heating element 114 based on the signal output by the temperature sensor 116; based on the temperature, selectively actuate the heating element 114 to regulate temperature of water dispensed by the nozzle 130 to within a threshold deviation of a target dispense temperature; and, selectively drive the set of positioner actuators 156 to drive the nozzle 130 across a sequence of positions defined by a target dispense pattern (e.g., a spiral pattern) defined for the dispense cycle.

1.1 Multiple Pour-Over Setups

One variation of the automated boiler 100 includes a container 110 configured to seat on a prep surface and including: a water reservoir 112 configured to transiently store a volume of water; a heating element 114 configured to heat metered volumes of water received from the water reservoir 112; a temperature sensor 116 configured to output a signal representing a temperature of water exiting the heating element 114; and an outlet fluidly coupled to the heating element 114. The automated boiler 100 further includes: a hose 120 fluidly coupled to the outlet of the container 110; a nozzle 130 fluidly coupled to the hose 120, opposite the outlet, and configured to transiently dispense volumes of water into a set of pour-over setups loaded with coffee grounds and arranged on the prep surface about the container 110; a set of sensors 170 installed on the nozzle 130 and configured to output signals corresponding to location of a pour-over setup on the prep surface; a lid 140 flexibly coupled to the container 110 and defining a slot; and a positioner assembly 150—arranged within the lid 140—including a nozzle arm 152 extending through the slot and defining a head configured to accept and retain the nozzle 130 at a target height from the prep surface, and a set of positioner actuators 156 configured to transiently drive translation of the nozzle arm 152.

In this variation, the controller 160 is configured to: based on the signal output by the temperature sensor 116, selectively actuate the heating element 114 to regulate temperature of water dispensed by the nozzle 130 to within a threshold deviation of a target dispense temperature; interpret a first location of a first central axis of a first pour-over setup arranged on the prep surface based on a first signal output by the set of sensors 170; interpret a second location of a second central axis of a second pour-over setup arranged on the prep surface based on a second signal output by the set of sensors 170; selectively drive the set of positioner actuators 156 to drive the nozzle 130 across a first sequence of positions defined by a first target dispense pattern and the first location to dispense heated water into the first pour-over setup according to a first target dispense pattern; and selectively drive the set of positioner actuators 156 to drive the nozzle 130 across a second sequence of positions defined by a second target dispense pattern and the second location to locate the nozzle 130 over the second pour-over setup in replacement of the first pour-over setup and dispense heated water into the second pour-over setup according to the second target dispense pattern.

1.2 Automated Boiler+Automated Brew Machine

In one variation, the automated boiler 100 is configured to transiently interface with an automated brew machine: configured to automate brew cycles for batches of coffee; and including a first coupling feature and a brew chamber configured to heat a volume of water occupying the brew chamber. In this variation, the nozzle 130 includes a second coupling feature configured to transiently couple to the first coupling feature of the automated brew machine to selectively dispense heated water into the brew chamber for brewing of a batch of coffee.

2. Applications

Generally, the automated boiler 100 is configured to automate dispensation of heated water into a pour-over coffee maker for brewing batches of pour-over coffee. In particular, the automated boiler 100 includes: a container 110 configured to seat on a prep surface (e.g., a countertop) and including a water reservoir 112—configured to accept and/or store a volume of water—and a heating element 114 configured to heat metered volumes of water received from the water reservoir 112; a nozzle 130 fluidly coupled to the heating element 114 via a flexible hose 120 extending from the container 110 and configured to transiently dispense metered volumes of hot water into a pour-over setup (i.e., a pour-over coffee maker) arranged adjacent the container 110 on the prep surface; a lid 140 flexibly coupled (e.g., removably coupled, rotatably coupled) to the container 11o and including a nozzle arm 152 extending from the lid 140 and defining a head configured to accept and retain the nozzle 130 at a fixed height from the prep surface over the pour-over setup; and an arm positioner assembly 150 integrated within the lid 140 and configured to drive the nozzle arm 152 to translate the head—and the nozzle 130 seated on the head—across a sequence of positions according to a target dispense pattern (e.g., a spiral pattern).

The automated boiler 100 can therefore: rapidly heat metered volumes of water flowing through the heating element 114—such as immediately before dispensation into the pour-over setup via the nozzle 130—to achieve a consistent and accurate dispense temperature of water dispensed at the nozzle 13o; regulate a flowrate of heated water into the nozzle 130 and dispense metered volumes of water into the pour-over setup arranged beneath the nozzle 13o; and concurrently translate the head via actuation of the positioner assembly 150 according to a particular dispense pattern defined for dispensation of water during a current dispense cycle and therefore achieve a uniform distribution of moisture in coffee grounds contained in the pour-over setup.

In one implementation, the automated boiler 100 includes: a base assembly configured to seat on a prep surface and including a container 110 and a lid 140 flexibly coupled to the container 11o; a water reservoir 112 arranged in the container 110 and configured to accept and/or store a volume of water (e.g., 1 Liter, 2 Liters, 5 Liters); a heating element 114—fluidly coupled to the water reservoir 112 within the container 11o (e.g., below the water reservoir 112)—configured to transiently ingest metered volumes of water from the water reservoir 112 and heat water flowing through the heating element 114 to a dispense temperature defined for a current dispense cycle; a hose 120 fluidly coupled to an outlet of the heating element 114 and extending outward from the container 110; a nozzle 130 fluidly coupled to the hose 120 and configured to dispense heated volumes of water—received from the heating element 114 via the hose 120—into a pour-over setup arranged on the prep surface; a nozzle arm 152 extending through a slot of the lid 140 outward (e.g., approximately orthogonal) from the base assembly and configured to receive and retain the nozzle 130 to seat the nozzle 130 over the pour-over setup; a set of pumps integrated within the container 110 and configured to selectively drive flow of water from the water reservoir 112, through the heating element 114, and upward through the hose 120 to the nozzle 130 for dispensation; and a set of pump actuators installed within the container 110 and configured to drive the set of pumps.

Thus, during a dispense cycle, the automated boiler 100 can accurately control temperature and flow of heated water to the nozzle 130 via actuation of the set of pumps and the heating element 114. By heating metered volumes of water external the water reservoir 112 and en route to the nozzle 130 for dispensation—rather than pre-heating a larger volume of water stored in the water reservoir 112—the automated boiler 100 can: substantially reduce a heating duration required for heating water to the target dispense temperature; and increase accuracy and precision of the dispense temperature by continuously heating discrete volumes of water prior to dispensation rather than heating the larger volume of water in the water reservoir 112, which may lead to a decrease in dispense temperature of water over a duration of the dispense cycle.

Furthermore, the automated boiler 100 can also include a positioner assembly 150 integrated within the lid 140 and configured to drive translation of the nozzle arm 152—such as forward (e.g., away from the base assembly), backward (e.g., toward the base assembly), and/or laterally within an arm plane coplanar the lid 140—to translate the nozzle 130 across a sequence of positions over the pour-over setup according to a target dispense pattern defined for a current dispense cycle. In one example, the lid 140 defines a slot—such as extending circumferentially about the lid 140 and coplanar the arm plane—and includes: the nozzle arm 152 extending through the slot and defining a head configured to receive and retain the nozzle 130 with a nozzle 130 outlet extending downward toward the pour-over setup; and a positioner assembly 150 including a set of positioner arms 154—flexibly coupled to the nozzle arm 152 at a pivot arranged within the lid 140—and a set of positioner actuators 156 configured to transiently drive the set of positioner arms 154 to drive translation of the nozzle arm 152 within the slot and therefore translate the nozzle 130—seated on the head of the nozzle arm 152—across the sequence of positions defined by the target dispense pattern.

The automated boiler 100 can therefore achieve: a target dispense temperature of water dispensed into the pour-over setup; a target moisture distribution (e.g., uniform or variable) across coffee grounds contained in the pour-over setup—such as to evenly saturate all coffee grounds during a bloom period—by controlling a flowrate of water distributed to the heating element 114 and the nozzle 130 from the water reservoir 112 and by controlling a dispense pattern (e.g., a spiral pattern) of water dispensed into the pour-over setup via driving of the head across a sequence of positions by the position assembly.

Generally, the automated boiler 100 can include a controller 160 configured to execute a dispense cycle according to a set of dispense parameters defined for the dispense cycle, such as including a target dispense pattern, a target dispense temperature, a target volume of coffee brewed in the pour-over setup, etc. In particular, the controller 160 can: selectively actuate the set of pumps to regulate flow of water from the reservoir, through the heating element 114, and to the nozzle 130 to achieve a target moisture distribution in coffee grounds; selectively actuate the heating element 114 to heat water flowing through the heating element 114 to achieve a uniform dispense temperature; and trigger the set of arm actuators to selectively extend, retract, and/or translate the nozzle 130 relative a central axis—defined by the pour-over setup—according to a dispense pattern defined by the set of dispense parameters.

3. Container

Generally, the automated boiler 100 includes a container 110: configured to seat on a prep surface (e.g., a countertop); configured for transport and/or handling by a human, such as for cleaning and/or relocating on a particular prep surface; and including a water reservoir 112 configured for transiently storing a volume of water. Generally, the container 110 can define a footprint of a target dimension, such that a user may readily locate the container 110 on a prep surface—such as a countertop in the user's home—in preparation for preparing a batch of pour-over coffee.

The container 110 can also define: a lid 140-receiving section configured to accept and retain a lid 140—including a positioner assembly 150 configured to support and drive translation of the nozzle 130 during execution of a dispense cycle—transiently coupled to the container 11o; and a hose 120 inlet fluidly coupled to the heating element 114 and configured to couple to an end of the hose 120 opposite the nozzle 130. A user may therefore remove the lid 140 from the container 110 to access the water reservoir 112 and fill the water reservoir 112 with a volume of water in preparation for one or more dispense cycles.

In one implementation, the container 110 includes: a water reservoir 112 defining a target internal volume (e.g., one liter, two liters) and configured to store a volume of water; a heating element 114 fluidly coupled to the water reservoir 112; a set of pumps configured to draw water through the heating element 114 and toward the nozzle 130 for dispensation; and a set of pump actuators mechanically coupled to the set of pumps and configured to transiently drive the set of pumps. The container 110 can also include a controller 160 configured to: transiently actuate the set of motors to regulate flow of water distributed to the nozzle 130 for dispensation; and transiently actuate the heating element 114 to regulate a temperature of water exiting the heating element 114 and/or dispensed by the nozzle 130.

The container 110 can also include a power supply (e.g., a battery) configured to supply power to the set of pump actuators, the heating element 114, and the controller 160.

3.1 Heating Element 114

Generally, the automated boiler 100 includes a heating element 114 configured to heat a volume of water received from the water reservoir 112 prior to dispensation of the volume of water into a pour-over setup arranged on the prep surface. In particular, the container 110 can include a heating element 114: fluidly coupled to the water reservoir 112; defining an inlet fluidly coupled to the water reservoir 112; defining an outlet fluidly coupled to the hose 120; and configured to regulate temperature of metered volumes of water—received from the water reservoir 112—from an inlet temperature at the inlet to an outlet temperature—exceeding the inlet temperature and within a target temperature range (e.g., defined by a brew protocol)—at the outlet.

In one implementation, the heating element 114 includes: a coil (e.g., a thermocoil)—formed of a thermally-conductive material (e.g., copper)—fluidly coupled to the water reservoir 112 and the hose 120; and a set of heating elements thermally coupled to the coil and configured to transiently heat the coil and therefore heat water flowing through the coil.

The heating element 114 can therefore heat volumes of water flowing through the coil in real-time—such as immediately before dispensing these volumes of water via the nozzle 130—rather than heat a volume of water stored in the reservoir, thereby: reducing energy required to heat water dispensed by the automated boiler 100, as only water required for a particular dispense cycle is heated; and minimizing delays in dispensation due to heating of a large volume of water in the reservoir. For example, the heating element 114 can be configured to heat water flowing through the coil—from an ambient temperature within the reservoir to a target dispense temperature (e.g., 200 degrees Fahrenheit)—within seconds (e.g., less than two seconds, less than five seconds).

4. Dispenser Assembly

Generally, the automated boiler 100 includes a dispenser assembly coupled to the container 110 and configured to transiently dispense metered volumes of water from the reservoir into a pour-over setup arranged on the prep surface. In particular, the dispenser assembly can include: a hose 120 defining a first end fluidly coupled to an outlet of the heating element 114 and a second end opposite the first end; and a nozzle 130 fluidly coupled to the second end of the hose 120 and configured to dispense metered volumes of water into a pour-over setup arranged below the nozzle 130 on the prep surface.

The nozzle 130 defines: an upper section—defining a nozzle 130 inlet fluidly coupled to the hose 120—configured to seat on a head of the nozzle arm 152 in a dispense position; and a lower section—defining a nozzle 130 outlet—extending from the upper section below the head of the nozzle arm 152 and toward the prep surface in the dispense position, such that the nozzle 130 can dispense hot water toward the pour-over setup arranged vertically below the nozzle 130 on the prep surface.

4.1 Water Return+Dispense Temperature Control

In one variation, the automated boiler 100 can include a water return line configured to selectively convey water from the nozzle 130 back into the water reservoir 112 to regulate a dispense temperature of water dispensed from the nozzle 130 into the pour-over setup.

For example, at a start of a dispense cycle, the hose 120 may be pre-filled with a volume of water remaining in the hose 120 from a previous dispense cycle. Rather than dispense this relatively-cooled (e.g., room-temperature) volume of water from the nozzle 130, the automated boiler 100 can return this volume of water to the water reservoir 112, thereby avoiding dispensation of water at temperatures below a target dispense temperature. In another example, the automated boiler 100 can similarly return this volume of water to the water reservoir 112 at an end of the dispense cycle to purge the hose 120 of any remaining water not dispensed into the pour-over setup during the dispense cycle.

In one implementation, the automated boiler 100 can include a set of water lines extending through the hose 120 and including: a supply line—fluidly coupled to an outlet of the heating element 114 and the nozzle 130 inlet—configured to convey heated water received from the heating element 114 to the nozzle 130 inlet; and a return line—fluidly coupled to the nozzle 130 inlet and the water reservoir 112—configured to selectively convey water from the nozzle 130 inlet to the water reservoir 112. In this implementation, the automated boiler 100 can further include: a pump configured to regulate flow of water upward through the hose 120 via the supply line; and a temperature sensor 116 installed at the nozzle 130 inlet and/or within the hose 120 and configured to output a temperature signal representing a temperature of the water approaching and/or at the nozzle 130 inlet. The controller 160 can then: read the temperature signal to interpret the temperature of the water at the nozzle 130 inlet; and selectively trigger flow of water from the nozzle 130 inlet into the nozzle 130 outlet and/or into the supply line, such as via a set of valve 132s coupled to the nozzle 130 inlet. Alternatively, the controller 160 can automatically trigger purging of water from the hose 120 via the return line—such as for a fixed duration (e.g., less than five seconds)—before and/or after execution of a dispense cycle.

In another implementation, the automated boiler 100 can include: a set of fluid supply lines—including a hot supply line fluidly coupled to the heating element 114 and a cold supply line fluidly coupled directly to the water reservoir 112—configured to convey water to the nozzle 130 from the container 11o; and a return line fluidly coupled to the hot supply line and configured to convey hot water from the nozzle 130 inlet back into the water reservoir 112. In this implementation, the nozzle 130 can define a mixing chamber fluidly coupled to both the hot and cold supply lines and configured to promote mixing of hot water and cold water (e.g., room temperature water) within the mixing chamber for dispensation of uniform temperature water from the nozzle 130 outlet fluidly coupled to the mixing chamber. In this implementation, the controller 160 can regulate flow of water through the set of fluid supply lines and into the mixing chamber and/or the return line to regulate temperature and flowrate of water dispensed from the nozzle 130 during the dispense cycle.

In one example, the automated boiler 100 can include a set of fluid lines—extending through the hose 120—including: a hot supply line configured to convey heated water from the outlet of the heating element 114 to the nozzle 130 inlet; a cold supply line configured to convey water (e.g., room-temperature water) directly from the water reservoir 112 to the nozzle 130 inlet; and a hot return line configured to convey water from the hot supply line—at and/or proximal the nozzle 130 inlet—back into the water reservoir 112. The automated boiler 100 can also include: a first pump configured to regulate flow of water upward through the hose 120 via the first supply line; a second pump configured to regulate flow of water upward through the hose 120 via the second supply line; a set of pump actuators—including a first pump actuator mechanically coupled to the first pump and a second pump actuator mechanically coupled to the second pump—configured to transiently actuate the first and second pump to regulate flow of hot and cold water to the nozzle 130 inlet; a hot-line valve 132 operable in a dispense position to direct flow of hot water from the hot supply line into the nozzle 130 chamber and a return position to direct flow of hot water from the hot supply line into the return line for recycling back into the water reservoir 112; and a temperature sensor 116 coupled to the hot supply line at the nozzle 130 inlet.

In this example, during a dispense cycle, the controller 160 can: selectively actuate the first pump to regulate flow of water through the heating element 114 and to the nozzle 130 inlet; selectively actuate the second pump to regulate flow of water from the water reservoir 112 to the nozzle 130 inlet; access timeseries temperature signals output by the temperature sensor 116 to interpret timeseries temperatures of heated water in the hot water line at the nozzle 130 inlet based on the temperature of hot water at the temperature sensor 116, a target dispense temperature defined for the dispense cycle, and a target dispense rate defined for the dispense cycle; and selectively actuate the valve 132 between the dispense and return positions to supply a particular ratio of hot and cold water flowing into the mixing chamber—and at a particular volumetric flowrate—to achieve the target dispense temperature, the target dispense rate, and/or a target dispense volume defined for the dispense cycle.

4.2 Heated Chamber+Water Recirculation

In one implementation, the automated boiler 100 includes a secondary chamber 118—thermally coupled to and/or coextensive the heating element 114—configured to receive metered volumes of water from the water reservoir 112 for heating via the heating element 114.

In this implementation, the automated boiler 100 can include a set of fluid pumps configured to drive flow of water from the water reservoir 112, into the secondary chamber 118, and toward the nozzle 130 for dispensation. In particular, the automated boiler 100 can include: a first pump—interposed between the water reservoir 112 and the secondary chamber 118—defining a first pump inlet fluidly coupled to the water reservoir 112 and a first pump outlet; a secondary chamber 118 (or "water chamber") fluidly coupled to the first pump outlet and thermally coupled to the heating element 114; and a second pump—interposed between the secondary chamber 118 and the nozzle 130—defining a second pump inlet fluidly coupled to the secondary chamber 118 and a second pump outlet fluidly coupled to the hose 120. The controller 160 can therefore be configured to: trigger actuation of the first pump to convey water from the water reservoir 112 into the water chamber; and trigger actuation of the second pump to convey water from the water reservoir 112 into the hose 120 and toward the nozzle 130.

Additionally, in another implementation, the automated boiler 100 can be configured to recirculate water from the nozzle 130 back into the (heated) secondary chamber 118 in order to achieve a target dispense temperature of water present in the hose 120 and/or proximal the nozzle 130 in preparation for dispensation. For example, a user may push a button or turn a knob 192 on the nozzle 130 to manually trigger dispensation of water from the nozzle 130 and into the pour-over setup. By recirculating water from the hose 120 and back into the secondary chamber 118, the automated boiler 100 can release heated water—at and/or approximately (e.g., within one percent, five percent, ten percent) at the target dispense temperature—within milliseconds or seconds of the user manually triggering dispensation.

In particular, in this implementation, the hose 120 can include: a supply fluid line 122 configured to convey water from the secondary chamber 118 and/or the heating element 114—thermally coupled to and/or coextensive the secondary chamber 118—toward the nozzle 130; and a return fluid line 124 configured to convey water received from the nozzle 130 to the secondary chamber 118 and/or heating element 114. The nozzle 130 can include a valve 132 (e.g., a tri-state valve 132) including: a valve inlet configured to receive metered volumes of water from the supply fluid line 122; a valve 132 dispense outlet—operable in an open position and a closed position—configured to transiently release metered volumes of water received at the valve inlet into the pour-over setup; and a valve 132 return outlet configured to convey volumes of water received at the valve inlet into the return fluid line 124. Therefore, when the valve 132 dispense outlet occupies the closed position, the valve 132 returns water received via the supply fluid line 122—from the (heated) secondary chamber 118—back to the secondary chamber 118 via the valve 132 return outlet. The automated boiler 100 can, therefore, continuously or semi-continuously circulate water through the hose 120—from the secondary chamber 118 toward the valve inlet via the supply fluid line 122 and from the valve 132 return outlet toward the secondary chamber 118 via the return fluid line 124—to enable dispensation of heated water at the target dispense temperature approximately on-demand. For example, the automated boiler 100 can include a user interface 190 (e.g., a button, a knob) coupled to the nozzle 130 and configured to trigger the valve 132 dispense outlet to occupy the open position to release metered volumes of water—at the target dispense temperature—into the pour-over setup responsive to a user input at the user interface 190.

5. Lid: Nozzle Arm+Positioner Assembly

Generally, the automated boiler 100 includes a lid 140 coupled (e.g., flexibly coupled) to the lid 140-receiving section of the container 110 and including a positioner assembly 150 configured to support and drive translation of the nozzle 130 (e.g., according to a dispense pattern) during execution of a dispense cycle. The lid 140 can be removably coupled to the container 11o, such that a user may remove the lid 140 to access the water reservoir 112 within the container 110 for refilling, emptying, and/or cleaning.

In particular, the lid 140 can define a slot extending circumferentially about the lid 140. The nozzle arm 152 can define: an inner end (flexibly) coupled to the lid 140; and an outer end—opposite the inner end—extending from the lid 140 and including a head configured to transiently receive and retain the nozzle 130 in a target orientation, such as coaxial a pour-over axis defined by the pour-over setup arranged below the nozzle 130. Furthermore, the lid 140 can include a nozzle arm 152 of a particular length that locates the head at least a threshold distance from the base assembly, such that a user may locate a pour-over setup adjacent the base assembly and below the head on the prep surface.

In one implementation, the lid 140 includes: a nozzle arm 152 extending through the slot and defining a head configured to receive and retain the nozzle 130 with a nozzle 130 outlet extending downward toward the pour-over setup; and a positioner assembly 150 including a set of positioner arms 154—flexibly coupled to the nozzle arm 152 at a pivot arranged within the lid 140—and a set of positioner actuators 156 configured to transiently drive the set of positioner arms 154 to drive translation of the nozzle arm 152 within the slot and therefore translate the nozzle 130—seated on the head of the nozzle arm 152—across the sequence of positions defined by the target dispense pattern.

In one example, the positioner assembly 150 includes: a first positioner arm 154 defining a first end rotatably coupled to a fixed pivot within the lid 140 and a second end pivotably coupled to the inner end of the nozzle arm 152; a second positioner arm 154 defining a third end rotatably coupled to a movable pivot within the lid 140 and a fourth end pivotably coupled to the inner end of the nozzle arm 152 and the second end of the first positioner arm 154. The positioner assembly 150 can further include: a first positioner actuator 156 coupled to the fixed pivot and configured to drive rotation of the first positioner arm 154 about the fixed pivot; and a second positioner actuator 156 coupled to the movable pivot and configured to drive rotation of the second positioner arm 154 about the movable pivot. The first and second positioner actuators 156 can, therefore, cooperate to drive the inner end of the nozzle arm 152 in a particular pattern within the lid 140 and, therefore, drive the head in a target dispense pattern—corresponding to the particular pattern—defined for the dispense cycle. The second positioner actuator 156 can thus cooperate with the first positioner actuator 156 to drive translation of the nozzle arm 152 within the lid 140 to drive the head in the target dispense pattern over the pour-over setup.

6. Sensor Suite

The automated boiler 100 can include a suite of sensors 170 configured to output signals to the controller 160 for regulating dispense parameters during execution of a dispense cycle.

In one implementation, the automated boiler 100 includes an optical sensor (e.g., a camera) arranged on the nozzle 130 and configured to output optical signals to the controller 160 representing presence and/or absence of a pour-over setup below the nozzle 130.

Additionally or alternatively, in another implementation, the automated boiler 100 can include a depth sensor configured to transiently capture depth images of a pour-over setup arranged below the nozzle 130 in the dispense position. In this example, the controller 160 can: read a signal output by the depth sensor; and interpret a distance between the optical sensor—such as arranged proximal the nozzle 130 outlet—and an upper rim of the pour-over setup and/or of a filter arranged within the pour-over setup.

Additionally or alternatively, in another implementation, the automated boiler can include a set of distance sensors 170 arranged on the nozzle 130 (and/or on the hose 120) and configured to output a signal representing distances between points on the pour-over setup. The controller 160 can then leverage this signal—and corresponding distances—to interpret a location of a center axis of the pour-over setup.

Additionally or alternatively, in another implementation, the automated boiler 100 can include a set of temperature sensors 116 configured to output signals representing a temperature of the water flowing toward the nozzle 130 outlet. For example, the automated boiler 100 can include: a first temperature sensor 116 arranged proximal an outlet of the heating element 114 and configured to output a signal representing a temperature of the water exiting the heating element 114; a second temperature sensor 116 arranged within the nozzle 130 and configured to output a signal representing a temperature of the water entering the nozzle 130. In another example, the automated boiler 100 can also include a temperature sensor 116 arranged proximal the nozzle 130 outlet and configured to output a signal representing temperature of air at the temperature sensor 116. The controller 160 can: read this signal output by the temperature sensor 116; interpret an air temperature at the nozzle 130 outlet based on the signal; and interpret a moisture level—such as dry, 50% wet, 100% wet, etc.—of coffee grounds in the pour-over setup based on the air temperature.

Additionally or alternatively, in another implementation, the automated boiler 100 can include a flow sensor (e.g., a flow meter) configured to output a signal representing an amount of water dispensed into the pour-over setup. For example, the automated boiler 100 can include a flow meter integrated within the nozzle 130 and configured to output flow signals representing a flowrate (or "dispense rate") of water through the nozzle 130 and dispensed into the pour-over setup. The controller 160 can then: read these flow signals from the flow meter; and interpret an amount of water dispensed into the pour-over setup accordingly. The controller 160 can therefore regulate a flowrate of water dispensed into the pour-over setup and/or a particular volume of water dispensed into the pour-over setup.

7. Cleaning Module

In one variation, the automated boiler 100 can also include a cleaning module 180 configured to sterilize water contained in the water reservoir 112 and/or sanitize surfaces of the water reservoir 112, such as between execution of dispense cycles. For example, the container 110 can include a set of UV lights 180 facing the water reservoir 112 and configured to transiently activate between dispense cycles, such as immediately before initiating a next dispense cycle and/or at a regular frequency (e.g., once per day) in order to reduce and/or avoid contamination of water stored in the water reservoir 112. The automated boiler 100 can therefore include this cleaning module 180 in order to minimize risk of water contamination—such as due to storing a volume of water in the reservoir for an extended duration—while reducing water waste due to emptying and refilling of the water reservoir 112 prior to each dispense cycle.

8. User Interface

The automated boiler 100 can also include a user interface 190 configured to receive a set of user inputs. For example, the automated boiler 100 can include a user interface 190 configured to receive user inputs: associated with a particular dispense protocol and/or a particular set of dispense parameters; associated with initiation of a dispense cycle; and/or associated with initiation of a cleaning cycle.

In one implementation, the automated boiler 100 can include a user interface 190 arranged on the base assembly, such as on the lid 140 and/or container 11o. For example, the automated boiler 100 can include a digital screen arranged on an outer surface of the container 110 and configured to receive touch inputs from the user.

Additionally or alternatively, in another implementation, the automated boiler 100 can include a user interface 190 on the hose 120 or nozzle 130. For example, the automated boiler 100 can include a knob 192 arranged on the hose 120 and configured to enable manual control of water flow and/or pressure through the hose 120 and dispensed via the nozzle 130. In this example, the user may actuate the knob 192 to selectively increase or decrease a flowrate of water into the pour-over setup.

Furthermore, in this example, the nozzle 130 can be detachably coupled to the head of the nozzle arm 152, such that the user may manually lift the nozzle 130 from the head and/or seat the nozzle 130 on the head. The user may, therefore, manually maneuver the nozzle 130 to dispense water into the pour-over setup in a particular pattern and/or maneuver the knob 192 on the nozzle 130 to manually adjust the flowrate of water into the pour-over setup. In particular, in this example, the automated boiler 100 can include a knob 192 coupled to the nozzle 130 and configured to receive user inputs, and the nozzle 130 can be configured to: transiently seat on the head in an automated position; decouple from the head in a manual position responsive to manual removal of the nozzle 130 from the head by a user; and dispense water into the pour-over setup at a flowrate corresponding to a position of the knob 192 input by the user.

9. Controller: Dispense Cycle

The automated boiler 100 includes a controller 160 configured to execute a dispense cycle according to a set of dispense parameters defined for the dispense cycle. In particular, a user may: locate the automated boiler 100 on the prep surface; fill the water reservoir 112 with water; locate a pour-over setup—loaded with coffee grounds—below the head of the nozzle arm 152 on the prep surface; and select a set of dispense parameters and/or a brew profile associated with a set of dispense parameters, such as via a user interface 190 on the base assembly and/or the nozzle 13o; and then trigger initiation of a dispense cycle (e.g., via the user interface 190). For example, the automated boiler 100 can: receive a set of dispense parameters, via a user interface 190 in communication with the controller 160, such as manually entered by a user; retrieve the dispense parameters from a recipe manually selected by the user via the user interface 190; retrieve the dispense parameters linked to an optical identifier (e.g., a barcode) read from a coffee packaging scanned by an optical sensor arranged on the automated boiler 100; or download the dispense parameters from an active or passive wireless transmitter arranged on a coffee packaging via a wireless receiver in the automated boiler 100. The controller 160 can then autonomously implement these dispense parameters to dispense hot water into the pour-over setup and therefore—in cooperation with the pour-over setup—brew a volume (e.g., a cup) of coffee within the pour-over setup.

The controller 160 can then dispense hot water into the pour-over setup according to these dispense parameters in order to achieve a particular brew profile selected by the user. In particular, the controller 160 can: selectively actuate the set of pumps to regulate flow of water from the reservoir, through the heating element 114, upward through the hose 120 and into the nozzle 130 for dispensation into the pour-over setup; selectively actuate the heating element 114 to heat water flowing through the heating element 114; and trigger the set of arm actuators to selectively extend, retract, and/or translate the nozzle 130 about the central axis according to a dispense pattern (e.g., a spiral pattern) defined by the set of dispense parameters.

9.1 Pour-Over Setup Detection

In one implementation, prior to initiating a dispense cycle, the controller 160 can execute a calibration cycle to: verify alignment of the nozzle 130 with the pour-over setup; align the nozzle 130 with the pour-over setup; and to calibrate a set of dispense parameters defined for the dispense cycle. In particular, the controller 160 can: identify a location of a central axis of the pour-over setup, such as relative a home location (e.g., a starting position) of the head of the nozzle arm 152; access a set of dispense parameters—including a target dispense pattern—defined for the dispense cycle; calculate a sequence of positions of the head for the dispense cycle based on the target dispense pattern and the location of the central axis of the pour-over setup; and thus derive a sequence of operating parameters—corresponding to the sequence of positions—for driving the positioner assembly 150 during the dispense cycle according to the target dispense pattern.

In one example, an operator may: locate the pour-over setup on the prep surface below the nozzle 130 arranged on the head; approximately align the central axis of the pour-over setup with the nozzle 130; and select a user input—such as on the nozzle 130 and/or on the base assembly—to indicate alignment of the nozzle 130 with the central axis. The controller 160 can then store a current location of the nozzle 130 as a location of the central axis of the pour-over setup.

Alternatively, in another example, the controller 160 can automatically detect a location of the central axis of the pour-over setup based on a signal output by a sensor integrated into the nozzle 130. For example, the nozzle 130 can include an optical sensor configured to output an image of a pour-over setup arranged beneath the nozzle 130. The controller 160 can then: identify a central axis of the pour-over setup in the image; calculate an offset (e.g., a horizontal offset) between the nozzle 130 and the central axis; and, based on the offset and a known location (e.g., the home location) of the nozzle 130, interpret a location of the central axis of the pour-over setup.

9.1.1 Scan Trajectory

In one implementation, the controller 160 can trigger a set of sensors 170—coupled to the nozzle 130 and/or hose 120—to execute a target scan trajectory in order to identify a location of the central axis of the pour-over setup arranged on the prep surface.

In particular, in this implementation, the automated boiler 100 can include a set of distance sensors 170 arranged on the nozzle 130 (and/or on the hose 120). The controller 160 can: trigger the set of distance sensors 170 to execute a scan trajectory—configured to derive distances between key points on the filter and/or coffee bed of the pour-over setup; interpret a location of the center axis of the pour-over setup based on signals output by the set of distance sensors 170 during execution of the scan trajectory; and thus selectively drive the set of positioner actuators 156 to drive the nozzle 130 across the sequence of positions defined by the target dispense pattern and the location of the center axis during a dispense cycle.

For example, the pour-over setup can include a paper filter defining a cone geometry and a coffee bed—of coffee grounds—arranged within and approximately concentric the paper filter. The controller 160 can thus trigger the set of distance sensors 170 to execute a target scan trajectory configured to yield: a first distance between a first set of points on a circumference of the paper filter; a second distance between a second set of points on a circumference of the coffee bed; a third distance between a third set of points on the circumference of the paper filter; and a fourth distance between a fourth set of points on the circumference of the coffee bed. Based on the first, second, third, and fourth distances, the controller 160 can interpret or predict a location of the center axis—approximately coaxial the paper filter and the coffee bed—of the pour-over setup.

9.2 Coffee Ground Agitation: Flow Restrictor

In one variation, the automated boiler 100 can include a flow restrictor 134 integrated within the hose 120 and/or nozzle 130 and configured to modify a jet speed of water dispensed from the nozzle 130 into the pour-over setup.

In particular, the controller 160 can: monitor a rate of decrease in water level—including water dispensed from the nozzle 130—on the coffee bed within the pour-over setup; leverage this rate of decrease in water level to interpret a quality—such as a fineness and/or coarseness—of coffee grounds present in the coffee bed; selectively trigger actuation of the flow restrictor 134 in order to adjust a jet speed of water dispensed from the nozzle 130 and therefore selectively agitate coffee grounds present in the coffee bed to increase or decrease the rate of decrease in water level. For example, more fine coffee grounds may migrate toward a bottom of a coffee filter in the pour-over setup while more course coffee grounds accumulate toward a top of the coffee filter, which may lead to clogging of the coffee filter and a reduction in the rate of decrease in water level within the coffee filter. The automated boiler 100 can, therefore, be configured to generate agitation—and thus drive more fine coffee grounds away from the bottom of the filter—by automatically adjusting the jet speed of water exiting the nozzle 130.

In one implementation, the automated boiler 100 can include: a set of sensors 170 installed on the nozzle 130 and configured to output signals associated with positioning of the pour-over setup on the prep surface; and a flow restrictor 134 arranged within the nozzle 130. In this implementation, the controller 160 can be configured to: interpret a location of a central axis of the pour-over setup based on signals received from the set of sensors 170; interpret a distance between a coffee bed of the pour-over setup and the nozzle 130 at the central axis; access an initial jet speed defined for dispensation; and, based on the height and the target jet speed, selectively actuate the flow restrictor 134 to achieve a target orifice size at an outlet of the nozzle 130. Then, during and/or following dispensation of water into the pour-over setup via the nozzle 130, the controller 160 can: interpret a rate of decrease in water level at the coffee bed based on signals received from the set of sensors 170; access a target rate defined for decrease in water level; calculate a target jet speed for dispensation based on a difference between the rate and the target rate and the initial jet speed; and selectively actuate the flow restrictor 134 to achieve a second orifice size at the outlet of the nozzle 130 corresponding to the target jet speed.

10. Controller: Cleaning Cycle

In one implementation, the controller 160 can selectively execute a cleaning cycle to sterilize water contained in the water reservoir 112. In this implementation, the controller 160 can selectively trigger actuation of a cleaning module 180—such as including a set of UV lights 180—configured to sterilize water and/or surfaces of the water reservoir 112, and therefore minimize risk of water contamination within the water reservoir 112.

In one example, the controller 160 can execute a cleaning cycle according to a pre-defined schedule, such as once-per-hour or once-per-day. Additionally or alternatively, in another example, the controller 160 can selectively execute a cleaning cycle responsive to a set of triggers, such as prior to initiation of a dispense cycle in order to sterilize water stored in the water reservoir 112 prior to dispensation from the water reservoir 112. Additionally or alternatively, in another example, an operator may manually trigger execution of a cleaning cycle, such as via selection of a corresponding user input on the user interface 190. In this example, the controller 160 can: receive a request to initiate a cleaning cycle responsive to selection of the user input; and automatically trigger actuation of the cleaning module 180 responsive to the request.

11. Variation: Manual Dispense Cycle

In one variation, a user may manually regulate flow of water—such as at a particular dispense temperature, flowrate, and/or in a particular dispense pattern—into the pour-over setup during a dispense cycle. In this variation, the automated boiler 100 can, therefore, be configured for both autonomous and manual operation.

In particular, in this variation, the user interface 190 can include a first user input (e.g., a knob, a selectable feature) configured to trigger flow of water into the pour-over setup. Additionally or alternatively, in this variation, the user interface 190 can include a second user input configured to enable user control of a dispense temperature of water into the pour-over setup. In one example, during a dispense cycle, the user may lift the nozzle 130 from the head; actuate the second user input to select a particular dispense temperature of heated water dispensed into the pour-over setup; actuate the first user input to trigger flow of heated water—at approximately the particular dispense temperature selected by the user—into the pour-over setup; and manually move the nozzle 130—above and relative the pour-over setup—to dispense heated water into the pour-over setup in a particular dispense pattern. Throughout the dispense cycle, the user may manually actuate the first and/or second user inputs to adjust the dispense temperature and/or water flowrate into the pour-over setup. When finished, the user may then replace the nozzle 130 on the head.

12. Variation: Automated Boiler+Automated Brew Machine

Figure 2:
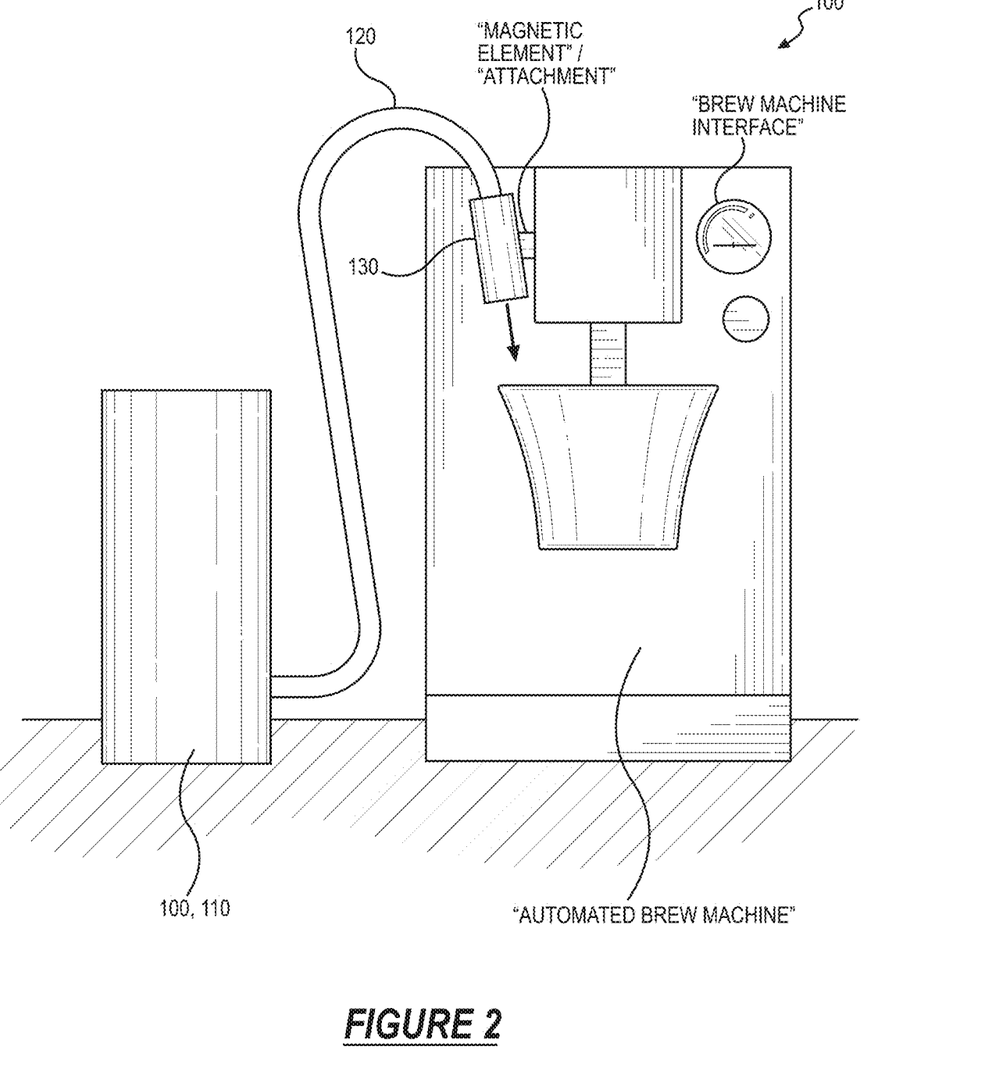
FIG. 2 is a schematic representation of one variation of the automated boiler.
Figure 3:
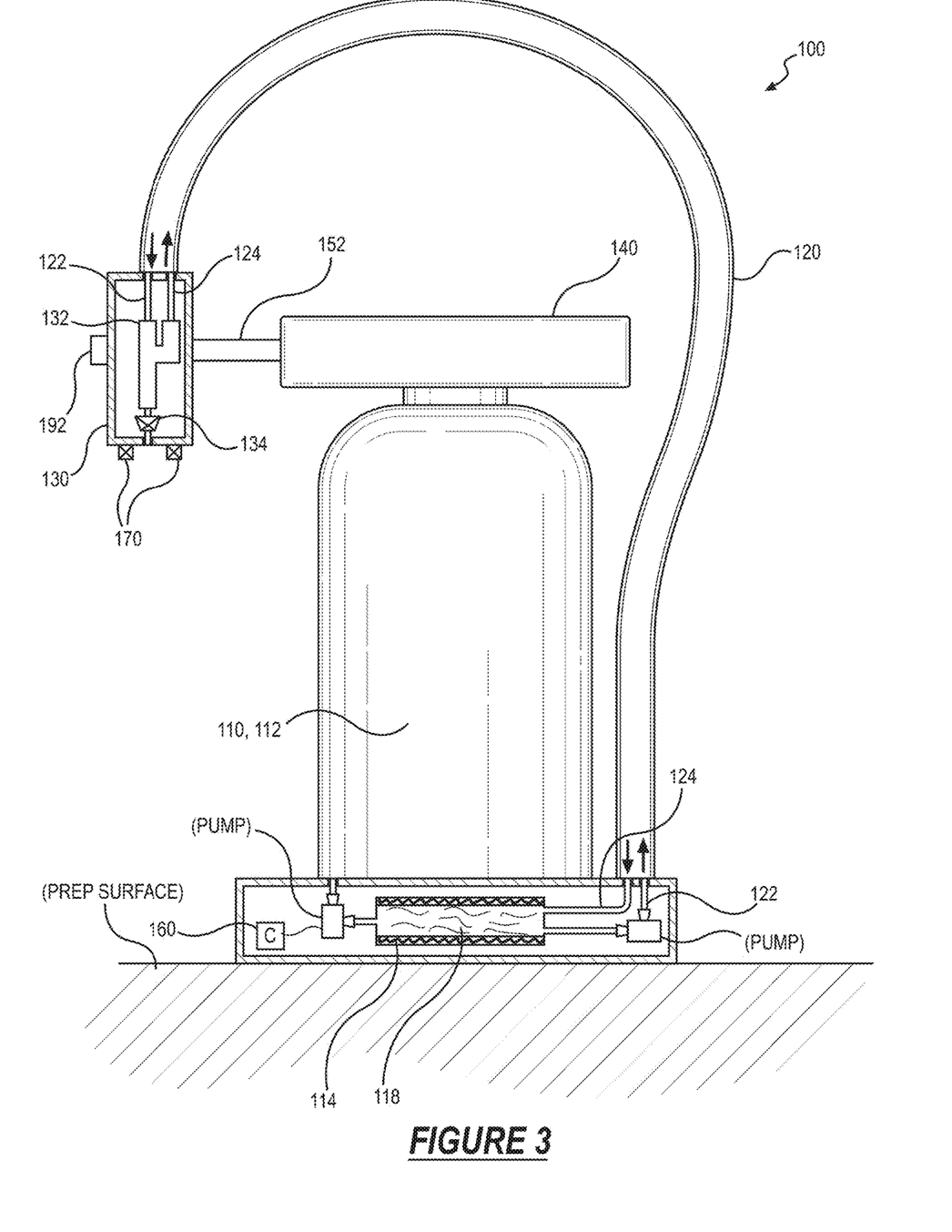
FIG. 3 is a schematic representation of one variation of the automated boiler.
Figure 4:
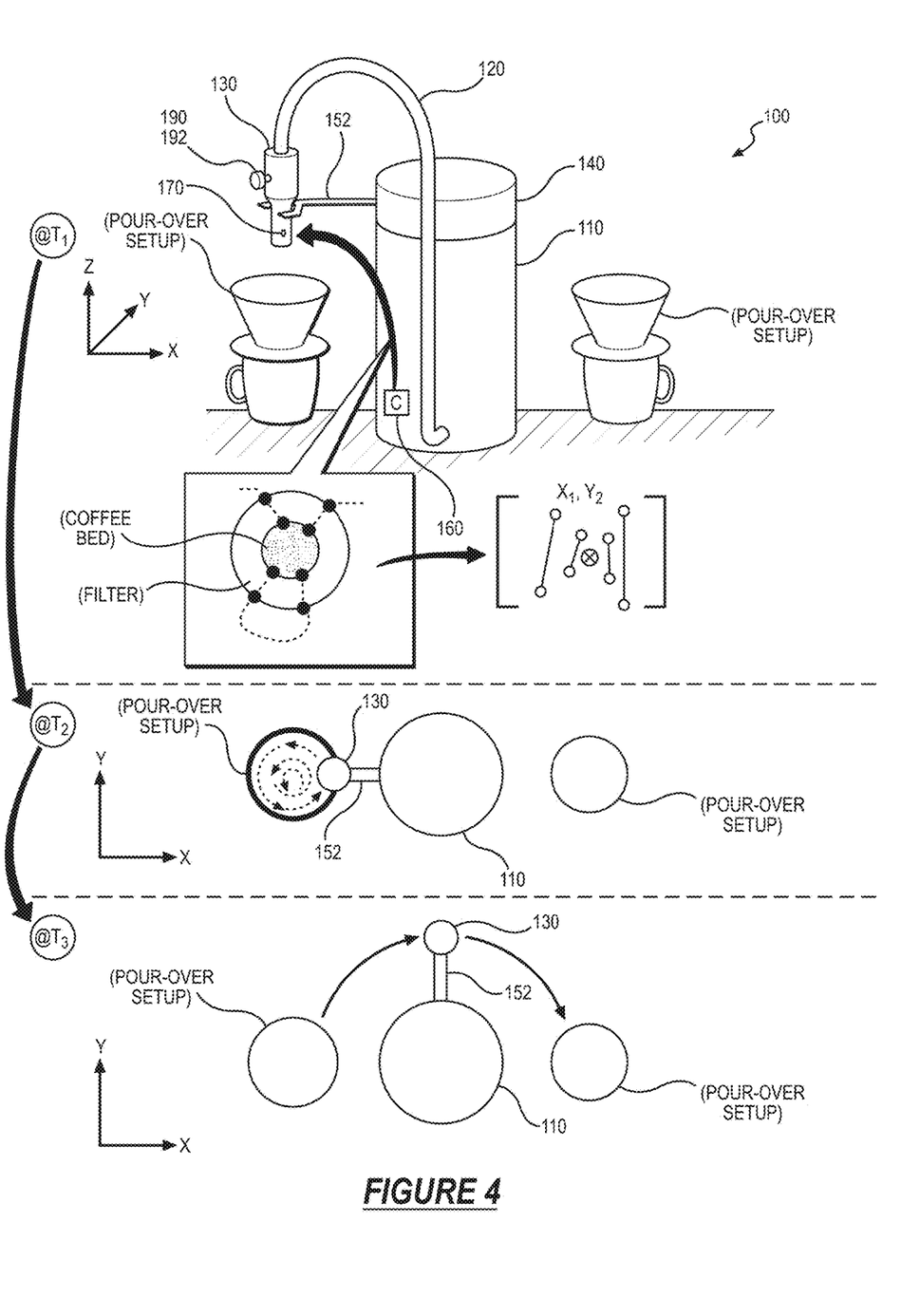
FIG. 4 is a schematic representation of one variation of the automated boiler.

In one variation, as shown in FIG. 2, the automated boiler 100 can be configured to interface with an automated brew machine configured to automate brew cycles for batches of coffee (e.g., drip coffee). In particular, in this variation, the nozzle 130 can be configured to transiently couple to a corresponding feature of the automated brew machine and selectively dispense heated water into a brew chamber—configured to heat a volume of water occupying the brew chamber—of the automated brew machine for brewing of a batch of coffee. More specifically, the automated brew machine can include a first coupling feature and the nozzle 130 can include a second coupling feature configured to transiently couple to the first coupling feature to selectively dispense heated water into the brew chamber for brewing of a batch of coffee. The automated boiler 100 can, therefore, cooperate with the automated brew machine to supply pre-heated water to the brew chamber, thereby reducing the duration of a brew cycle for the batch of coffee.

For example, the automated brew machine can include: an actuator; a brew assembly configured to receive a volume of water via a fluid inlet; a heating element 114 arranged about the brew assembly and configured to heat the volume of water to a target brew temperature; and a brew chamber configured to accept the volume of water—at the target brew temperature—from the brew assembly for brewing with a volume of coffee grounds or other brew ingredients (e.g., tea leaves) contained in the brew chamber. During a brew cycle, the automated brew machine can: transfer heated water from the brew assembly into the brew chamber responsive to actuation of the actuator in a first direction (e.g., a downward motion); and dispense a batch of brewed coffee out of the brew chamber and into a cup arranged below the brew chamber responsive to actuation of the actuator in a second direction opposite the first direction (e.g., an upward motion). In this example, the brew assembly can generally receive unheated volumes of water at unknown temperatures (e.g., room temperature). The automated brew machine can, therefore, actuate the heating element 114 to heat water in the brew assembly to the target brew temperature, such as during a heating period of a particular duration (e.g., two minutes or five minutes). Alternatively, an operator may: couple the nozzle 130 of the automated boiler 100 100 to the fluid inlet of the brew assembly; and initiate a particular dispense cycle (e.g., via the user interface 190) corresponding to the automated coffee machine to trigger dispensation of hot water—at a temperature approximating and/or approaching the target brew temperature—into the brew assembly of the automated coffee machine, thereby substantially reducing a duration of the heating period.

In one implementation, the nozzle 130 can include a magnetic element configured to transiently couple to a corresponding magnetic feature (e.g., a magnetic surface, a magnet) of the automated brew machine to align the nozzle 130 outlet with a water inlet fluidly coupled to a brew chamber of the automated brew machine. A user may therefore: manually remove the nozzle 130 from the head of the nozzle arm 152; and position the magnetic element of the nozzle 130 proximal the corresponding magnetic feature of the automated brew machine to magnetically couple the nozzle 130 to the automated brew machine and therefore align the nozzle 130 outlet with the water inlet of the brew chamber. In one example, the operator may then select a dispense cycle defined for the automated brew machine—such as defining a particular dispense temperature and/or volume—via the user interface 190 arranged on the base assembly.

Alternatively, the automated boiler 100 can be configured to automatically detect coupling (or "pairing") of the nozzle 130 with the automated brew machine and, therefore, automatically load a set of dispense parameters corresponding to the automated brew machine. In particular, in one example, the nozzle 130 can include an integrated magnetic sensor configured to output a signal representing a magnitude of magnetism and/or a current at the magnetic sensor. The controller 160 can thus: read this signal from the integrated magnetic sensor; interpret a magnitude of magnetism and/or current at the magnetic sensor; and, in response to the magnitude corresponding to an expected magnitude defined for coupling of the magnetic element to the corresponding magnetic feature of the automated brew machine, automatically load a set of dispense parameters defined for the automated brew machine and trigger execution of a dispense cycle according to these dispense parameters.

13. Multiple Pour-Over Setups

In one variation, the automated boiler 100 can be configured to automate concurrent dispense cycles for a set of pour-over setups arranged about the base assembly on the prep surface.

For example, the automated boiler 100 can: execute a first dispense cycle—such as including a first bloom cycle and a first brew cycle—according to a first set of dispense parameters defined for a first pour-over setup arranged in a first position on the prep surface; execute a second dispense cycle—such as including a second bloom cycle and a second brew cycle—according to a second set of dispense parameters defined for a second pour-over setup arranged in a second position on the prep surface; and execute a third dispense cycle—such as including a third bloom cycle and a third brew cycle—according to a third set of dispense parameters defined for a third pour-over setup arranged in a third position on the prep surface. In particular, in this example, the automated boiler 100 can: execute the first bloom cycle for the first pour-over setup according to the first set of dispense parameters; and initiate a first timer for a fixed duration (e.g., 30 seconds, 60 seconds) defined for the first bloom cycle. Then, prior to expiration of the first time, the automated boiler 100 can: execute the second bloom cycle for the second pour-over setup according to the second set of dispense parameters; initiate a second timer for a fixed duration defined for the second bloom cycle; execute the third bloom cycle for the third pour-over setup according to the third set of dispense parameters; and initiate a third timer for a fixed duration defined for the third bloom cycle. Then, in response to expiration of the first timer, the automated boiler 100 can execute the first brew cycle for the first pour-over setup according to the first set of dispense parameters. Additionally, in this example, the automated boiler 100 can: execute the second brew cycle for the second pour-over setup according to the second set of dispense parameters in response to expiration of the second timer; and execute the third brew cycle for the third pour-over setup according to the third set of dispense parameters in response to expiration of the third timer. The automated boiler 100 can thus simultaneously execute multiple dispense cycles—such as according to the same or different dispense parameters—for multiple pour-over setups arranged about the base assembly.

13.1 Retrieving Dispense Parameters

In this variation, the automated boiler 100 can retrieve a set of dispense parameters for each pour-over setup in the set of pour-over setups arranged about the base assembly.

In one implementation, a user may manually select a set of dispense parameters for each pour-over setup via the user interface 190. In one example, the user interface 190 can include a digital screen. The user may select and/or enter a quantity of pour-over setups in the set of pour-over setups via the digital screen. The user may then: select a first pour-over setup—corresponding to a first position on the prep surface—from the quantity of pour-over setups entered; select a first set of dispense parameters—such as including a target bloom duration, a target dispense pattern, a target brew volume, a target bloom and/or brew temperature, etc.—for the first pour-over setup; and repeat this process for each other pour-over setup in the set of pour-over setups. The controller 160 can then store these dispense parameters and calculate corresponding operating parameters—such as for the positioner assembly 150, the heating element 114, the set of pump actuators, etc.—for the dispense cycle accordingly.

In particular, in the preceding implementation, the controller 160 can: retrieve a set of brew parameters selected by a user for the dispense cycle; selectively actuate the heating element 114 to regulate the temperature of water dispensed by the nozzle 130 to within the threshold deviation of the target dispense temperature defined by the set of brew parameters; and selectively drive the set of positioner actuators 156 to drive the nozzle 130 across the sequence of positions defined by the target dispense pattern defined by the set of brew parameters.

Alternatively, in another implementation, the automated boiler 100 can automatically retrieve a set of dispense parameters for a particular pour-over setup, in the set of pour-over setups, based on optical features arranged on the pour-over setup. For example, each pour-over setup can be configured to include a color-coded identifier—such as a color-coded plate and/or a color-coded filter—associated with a particular set of dispense parameters. In this example, the automated boiler 100 can include an optical sensor arranged on the nozzle 130 and configured to output optical signals depicting these color-coded identifiers. The controller 160 can then: access an image of a pour-over setup output by the optical sensor; interpret a color of a particular identifier arranged on the pour-over setup based on features extracted from the image; and retrieve a set of dispense parameters associated with the color. For example, the controller 160 can: load a first set of dispense parameters in response to detecting a red identifier on a first pour-over setup; and load a second set of dispense parameters in response to detecting a green identifier on a second pour-over setup.

13.2 Controller: Calibration Cycle

In this variation, the controller 160 can execute a calibration cycle prior to initiating a dispense cycle to locate a set of pour-over setups arranged about the base assembly. For example, a user may arrange a set of pour-over setups about the base assembly—such as within a threshold distance proportional a length of the nozzle arm 152—and select a particular user input on the user interface 190 configured to trigger initiation of a calibration cycle.

For example, an operator may: locate a first pour-over setup at a first location on the prep surface (e.g., within a threshold distance of the base assembly); locate a second pour-over setup at a second location on the prep surface; and locate a third pour-over setup at a third location on the prep surface. The controller 160 can then: identify the first pour-over setup—defining a first central axis—at the first location on the prep surface; identify the second pour-over setup—defining a second central axis—at the second location on the prep surface; and identify the third pour-over setup—defining a third central axis—at the third location on the prep surface. The controller 160 can then: associate the first pour-over setup at the first location with a first set of dispense parameters retrieved for the first pour-over setup; associate the second pour-over setup at the second location with a second set of dispense parameters retrieved for the second pour-over setup; and associate the third pour-over setup at the third location with a third set of dispense parameters retrieved for the third pour-over setup.

In one implementation, the automated boiler 100 can identify a location of each pour-over setup, in the set of pour-over setups, based on user inputs entered by the operator during a setup period. For example, an operator may: manually remove the nozzle 130 from the head of the nozzle arm 152; locate the nozzle 130 directly over a first pour-over setup; and click a button on the nozzle 130 to indicate alignment of the nozzle 130 with the first pour-over setup. In this example, in response to the user selecting (e.g., clicking) the button on the nozzle 130, the controller 160 can: access a current location of the nozzle 130; calculate a first offset between a home location of the nozzle 130 and the current location; access a set of dispense parameters defined for the first pour-over setup, such as by prompting the operator to confirm and/or select dispense parameters via the user interface 19o; and pair the set of dispense parameters with the first location and/or first offset for implementation during execution of the dispense cycle, such as previously defined and/or by prompting the operator. The automated boiler 100 can then cooperate with the operator to repeat this process for each other pour-over setup in the set of pour-over setups.

13.3 Concurrent Cycles

In one implementation, the automated boiler 100 can be configured to automate concurrent dispense cycles—such as including bloom and/or brew cycles—for a set of pour-over setups (e.g., one or more pour-over setups) arranged about the base assembly on the prep surface, such as by: dispensing heated water into a first pour-over setup while heated water—dispensed from the nozzle 130—drains through a filter of a second pour-over setup; and/or dispensing heated water into the second pour-over setup while heated water—dispensed from the nozzle 130—drains through a filter of the first pour-over setup.

In particular, in this implementation, the automated boiler 100 can be configured to automate concurrent dispense cycles for a first pour-over setup arranged on the prep surface and a second pour-over setup arranged on the prep surface adjacent the first pour-over setup, each pour-over setup arranged within a threshold distance of the base assembly on the prep surface. The controller 160 is configured to: interpret a first location of a first central axis of the first pour-over setup arranged on the prep surface; interpret a second location of a second central axis of the second pour-over setup loaded with coffee grounds and arranged on the prep surface proximal the first pour-over setup; selectively drive the set of positioner actuators 156 to drive the nozzle 130 across a sequence of positions—defined by the target dispense pattern and the first location—to dispense heated water into the first pour-over setup according to a target dispense pattern; and selectively drive the set of positioner actuators 156 to drive the nozzle 130 across a second sequence of positions—defined by the target dispense pattern and the second location—to locate the nozzle 130 over the second pour-over setup in replacement of the first pour-over setup and dispense heated water into the second pour-over setup according to the target dispense pattern.

In one example, the controller 160 can: execute a first bloom cycle for the first pour-over setup; execute a second bloom cycle—succeeding the first bloom cycle—for the second pour-over setup; execute a first brew cycle—succeeding the first bloom cycle—for the first pour-over setup; and execute a second brew cycle—succeeding the first brew cycle—for the second pour-over setup. In particular, in this example, the controller 160 can, during the first bloom cycle for the first pour-over setup: selectively drive the set of position actuators to locate the nozzle 130 over the first pour-over setup; and trigger the nozzle 130 to dispense a first metered volume of water into the first pour-over setup according to a first set of dispense parameters defined for the first pour-over setup. Then, during the second bloom cycle for the second pour-over setup, the controller 160 can: selectively drive the set of position actuators to locate the nozzle 130 over the second pour-over setup; and trigger the nozzle 130 to dispense a second metered volume of water into the second pour-over setup according to a second set of dispense parameters defined for the second pour-over setup. Then, during the first brew cycle for the first pour-over setup, the controller 160 can: selectively drive the set of position actuators to locate the nozzle 130 over the first pour-over setup; and trigger the nozzle 130 to dispense a third metered volume of water into the first pour-over setup according to the first set of dispense parameters. Finally, during the second brew cycle for the second pour-over setup, the controller 160 can: selectively drive the set of position actuators to locate the nozzle 130 over the second pour-over setup; and trigger the nozzle 130 to dispense a fourth metered volume of water into the second pour-over setup according to the second set of dispense parameters.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. An automated boiler comprising:
a container configured to seat on a prep surface and comprising:
a water reservoir configured to transiently store a volume of water;
a heating element configured to heat metered volumes of water received from the water reservoir;
a temperature sensor configured to output a signal representing a temperature of water exiting the heating element; and
an outlet fluidly coupled to the heating element;
a hose fluidly coupled to the outlet;
a nozzle fluidly coupled to the hose, opposite the outlet, and configured to transiently dispense volumes of water into a pour-over setup loaded with coffee grounds and arranged on the prep surface;
a lid flexibly coupled to the container and defining a slot;
a positioner assembly arranged within the lid and comprising:
a nozzle arm extending through the slot and defining a head configured to accept and retain the nozzle at a target height from the prep surface above the pour-over setup;
a set of positioner arms flexibly coupled to the nozzle arm at a pivot arranged within the lid; and
a set of positioner actuators configured to transiently drive the set of positioner arms to drive translation of the nozzle arm and the nozzle; and
a controller configured to, during a dispense cycle:
interpret the temperature of water exiting the heating element based on the signal output by the temperature sensor;
based on the temperature, selectively actuate the heating element to regulate the temperature of water dispensed by the nozzle to within a threshold deviation of a target dispense temperature; and
selectively drive the set of positioner actuators to drive the nozzle across a sequence of positions defined by a target dispense pattern defined for the dispense cycle to dispense heated water into the pour-over setup according to the target dispense pattern.

2. The automated boiler of claim 1:
further comprising an automated brew machine:
configured to automate brew cycles for batches of coffee; and
comprising a first coupling feature and a brew chamber configured to heat a volume of water occupying the brew chamber; and
wherein the nozzle comprises a second coupling feature configured to transiently couple to the first coupling feature of the automated brew machine to selectively dispense heated water into the brew chamber for brewing of a batch of coffee.

3. The automated boiler of claim 2:
wherein the automated brew machine comprises the first coupling feature comprising a first magnet; and
wherein the nozzle comprises the second coupling feature comprising a second magnet configured to magnetically couple to the first magnet.

4. The automated boiler of claim 1:
wherein the hose comprises:
a supply fluid line configured to convey water from the heating element toward the nozzle; and
a return fluid line configured to convey water received from the nozzle to the heating element; and
wherein the nozzle comprises:
a valve comprising:
a valve inlet configured to receive metered volumes of water from the supply fluid line;
a valve dispense outlet:
configured to transiently release metered volumes of water received at the valve inlet into the pour-over setup; and
operable in an open position and a closed position; and
a valve return outlet configured to convey volumes of water received at the valve inlet into the return fluid line; and
a user interface coupled to the nozzle and configured to trigger the valve dispense outlet to occupy the open position to release metered volumes of water into the pour-over setup responsive to a user input at the user interface.

5. The automated boiler of claim 1, wherein the controller is configured to:
retrieve a set of brew parameters selected by a user for the dispense cycle;
selectively actuate the heating element to regulate the temperature of water dispensed by the nozzle to within the threshold deviation of the target dispense temperature defined by the set of brew parameters; and
selectively drive the set of positioner actuators to drive the nozzle across the sequence of positions defined by the target dispense pattern defined by the set of brew parameters.

6. The automated boiler of claim 1:
wherein the controller is configured to:
interpret a first location of a first central axis of the pour-over setup arranged on the prep surface;
interpret a second location of a second central axis of a second pour-over setup loaded with coffee grounds and arranged on the prep surface proximal the first pour-over setup;
selectively drive the set of positioner actuators to drive the nozzle across the sequence of positions defined by the target dispense pattern and the first location to dispense heated water into the pour-over setup according to the target dispense pattern; and
selectively drive the set of positioner actuators to drive the nozzle across a second sequence of positions defined by the target dispense pattern and the second location to:
locate the nozzle over the second pour-over setup in replacement of the first pour-over setup; and
dispense heated water into the second pour-over setup according to the target dispense pattern.

7. The automated boiler of claim 6, wherein the controller is configured to:
during a first bloom cycle for the pour-over setup:
selectively drive the set of position actuators to locate the nozzle over the pour-over setup; and trigger the nozzle to dispense a first metered volume of water into the pour-over setup according to a first set of dispense parameters defined for the pour-over setup;
during a second bloom cycle for the second pour-over setup, the second bloom cycle succeeding the first bloom cycle:
selectively drive the set of position actuators to locate the nozzle over the second pour-over setup; and
trigger the nozzle to dispense a second metered volume of water into the second pour-over setup according to a second set of dispense parameters defined for the second pour-over setup;
during a first brew cycle for the pour-over setup, the first brew cycle succeeding the second bloom cycle:
selectively drive the set of position actuators to locate the nozzle over the pour-over setup; and
trigger the nozzle to dispense a third metered volume of water into the pour-over setup according to the first set of dispense parameters; and
during a second brew cycle for the second pour-over setup, the second brew cycle succeeding the first brew cycle:
selectively drive the set of position actuators to locate the nozzle over the second pour-over setup; and
trigger the nozzle to dispense a fourth metered volume of water into the second pour-over setup according to the second set of dispense parameters.

8. The automated boiler of claim 1:
wherein the set of positioner arms comprises:
a first positioner arm defining a first end rotatably coupled to a fixed pivot within the lid and a second end pivotably coupled to the nozzle arm opposite the head; and
a second positioner arm defining a third end rotatably coupled to a movable pivot within the lid and a fourth end pivotably coupled to the nozzle arm and the second end of the first positioner arm; and
wherein the set of positioner actuators comprises:
a first positioner actuator coupled to the fixed pivot and configured to drive rotation of the first positioner arm about the fixed pivot; and
a second positioner actuator:
coupled to the movable pivot;
configured to drive rotation of the second positioner arm about the movable pivot; and
configured to cooperate with the first positioner actuator to drive translation of the nozzle arm within the lid to drive the head in the target dispense pattern over the pour-over setup.

9. The automated boiler of claim 1:
a first pump defining:
a first pump inlet fluidly coupled to the water reservoir; and
a first pump outlet;
a water chamber:
fluidly coupled to the first pump outlet; and
thermally coupled to the heating element;
a second pump:
defining a second pump inlet fluidly coupled to the water chamber; and
defining a second pump outlet fluidly coupled to the hose; and
wherein the controller is configured to:
trigger actuation of the first pump to convey water from the water reservoir into the water chamber; and
trigger actuation of the second pump to convey water from the water reservoir A into the hose and toward the nozzle.

10. The automated boiler of claim 1:
further comprising:
a set of sensors installed on the nozzle and configured to output signals associated with positioning of the pour-over setup on the prep surface; and
a flow restrictor arranged within the nozzle; and
wherein the controller is configured to:
interpret a location of a central axis of the pour-over setup based on signals received from the set of sensors;
interpret a distance between a coffee bed of the pour-over setup and the nozzle at the central axis;
access an initial jet speed defined for dispensation; and
based on the height and the target jet speed, selectively actuate the flow restrictor to achieve a target orifice size at an outlet of the nozzle.

11. The automated boiler of claim 10:
wherein the controller is configured to:
interpret a rate of decrease in water level at the coffee bed based on signals received from the set of sensors;
access a target rate defined for decrease in water level;
calculate a target jet speed for dispensation based on a difference between the rate and the target rate and the initial jet speed; and
selectively actuate the flow restrictor to achieve a second orifice size at the outlet of the nozzle corresponding to the target jet speed.

12. The automated boiler of claim 1:
further comprising a set of UV lights facing the water reservoir; and
wherein the controller is configured to transiently actuate the set of UV lights to sanitize water stored in the water reservoir.

13. The automated boiler of claim 1:
further comprising a set of distance sensors arranged on the nozzle; and
wherein the controller is configured to:
trigger the set of distance sensors to execute a scan trajectory;
interpret a location of a center axis of the pour-over setup based on signals output by the set of distance sensors during execution of the scan trajectory; and
selectively drive the set of positioner actuators to drive the nozzle across the sequence of positions defined by the target dispense pattern and the location of the center axis.

14. The automated boiler of claim 1:
further comprising a set of optical sensors arranged on the nozzle; and
wherein the controller is configured to:
trigger the set of optical sensors to capture images of the pour-over setup arranged beneath the nozzle on the prep surface;
interpret a location of a center axis of the pour-over setup based on features extracted from images captured by the set of optical sensors; and
selectively drive the set of positioner actuators to drive the nozzle across the sequence of positions defined by the target dispense pattern and the location of the center axis.

15. The automated boiler of claim 1:
further comprising a knob coupled to the nozzle and configured to receive user inputs; and wherein the nozzle is configured to:
- transiently seat on the head in an automated position;
- decouple from the head in a manual position responsive to manual removal of the nozzle from the head by a user; and
- dispense water into the pour-over setup at a flowrate corresponding to a position of the knob input by the user.

16. An automated boiler comprising:
- a container configured to seat on a prep surface and comprising:
  - a water reservoir configured to transiently store a volume of water;
  - a heating element configured to heat metered volumes of water received from the water reservoir;
  - a temperature sensor configured to output a signal representing temperature of water exiting the heating element; and
  - an outlet fluidly coupled to the heating element;
- a hose fluidly coupled to the outlet of the container;
- a nozzle fluidly coupled to the hose, opposite the outlet, and configured to transiently dispense volumes of water into a set of pour-over setups loaded with coffee grounds and arranged on the prep surface about the container;
- a set of sensors installed on the nozzle and configured to output signals corresponding to location of a pour-over setup on the prep surface;
- a lid flexibly coupled to the container and defining a slot;
- a positioner assembly arranged within the lid and comprising:
  - a nozzle arm extending through the slot and defining a head configured to accept and retain the nozzle at a target height from the prep surface; and
  - a set of positioner actuators configured to transiently drive translation of the nozzle arm; and
- a controller configured to:
  - based on the signal output by the temperature sensor, selectively actuate the heating element to regulate temperature of water dispensed by the nozzle to within a threshold deviation of a target dispense temperature;
  - interpret a first location of a first central axis of a first pour-over setup arranged on the prep surface based on a first signal output by the set of sensors;
  - interpret a second location of a second central axis of a second pour-over setup arranged on the prep surface based on a second signal output by the set of sensors;
  - selectively drive the set of positioner actuators to drive the nozzle across a first sequence of positions defined by a first target dispense pattern and the first location to dispense heated water into the first pour-over setup according to a first target dispense pattern; and
  - selectively drive the set of positioner actuators to drive the nozzle across a second sequence of positions defined by a second target dispense pattern and the second location to:
    - locate the nozzle over the second pour-over setup in replacement of the first pour-over setup; and
    - dispense heated water into the second pour-over setup according to the second target dispense pattern.

* * * * *